US012630692B2

(12) United States Patent
Kataishi et al.

(10) Patent No.: US 12,630,692 B2
(45) Date of Patent: May 19, 2026

(54) SILICONE GEL COMPOSITION AND SILICONE GEL SHEET

(71) Applicant: Fuji Polymer Industries Co., Ltd., Nagoya (JP)

(72) Inventors: Takumi Kataishi, Aichi (JP); Yuko Kimura, Aichi (JP)

(73) Assignee: Fuji Polymer Industries Co., Ltd., Aichi (JP)

( * ) Notice: Subject to any disclaimer, the term of this patent is extended or adjusted under 35 U.S.C. 154(b) by 736 days.

(21) Appl. No.: 18/002,399

(22) PCT Filed: Apr. 5, 2021

(86) PCT No.: PCT/JP2021/014461
§ 371 (c)(1),
(2) Date: Dec. 19, 2022

(87) PCT Pub. No.: WO2022/004086
PCT Pub. Date: Jan. 6, 2022

(65) Prior Publication Data

US 2023/0227625 A1 Jul. 20, 2023

(30) Foreign Application Priority Data

Jul. 2, 2020 (JP) ................................ 2020-115156

(51) Int. Cl.
*C08K 5/01* (2006.01)
*C08J 5/18* (2006.01)
*C08K 9/06* (2006.01)

(52) U.S. Cl.
CPC .................. *C08K 5/01* (2013.01); *C08J 5/18* (2013.01); *C08K 9/06* (2013.01); *C08J 2383/07* (2013.01); *C08K 2201/001* (2013.01)

(58) Field of Classification Search
CPC ...... C08K 5/01; C08K 9/06; C08K 2201/001; C08K 2003/2227; C08K 2201/014;
(Continued)

(56) References Cited

U.S. PATENT DOCUMENTS 6,177,585 B1 1/2001 Chen et al.
6,380,301 B1 * 4/2002 Enami ................. C08K 5/5419
524/588

(Continued)

FOREIGN PATENT DOCUMENTS

EP 3 862 405 8/2021
JP 5-279687 10/1993

(Continued)

OTHER PUBLICATIONS

Extended European Search Report issued in European Application No. 21830914.4, Nov. 20, 2023, 7 pages.
International Search Report issued in International Application No. PCT/JP2021/014461, Jun. 15, 2021, 7 pages w/translation.

*Primary Examiner* — Mark Eashoo
*Assistant Examiner* — Zhen Liu
(74) *Attorney, Agent, or Firm* — HSML P.C.

(57) ABSTRACT

A silicone gel composition of the present invention contains the following components; A 100 parts by mass of an organopolysiloxane that is curable by an addition reaction; B. 0.01 to 10 parts by mass of an unsaturated hydrocarbon compound having one alkenyl group per molecule; and C. an addition reaction curing catalyst in a catalytic amount. The unsaturated hydrocarbon compound is at least one selected from the group consisting of an α-olefin that is liquid at room temperature (25° C.) and does not volatilize or decompose at 100° C. and α-methylstyrene. A silicone gel sheet of the present invention is obtained by molding the silicone gel composition into a sheet, and curing the sheet.

10 Claims, 1 Drawing Sheet

(58) Field of Classification Search
CPC ......... C08J 5/18; C08J 2383/07; C08G 77/12; C08G 77/20; C08L 83/04
See application file for complete search history.

(56) References Cited

U.S. PATENT DOCUMENTS

| | | | | |
|---|---|---|---|---|
| 2001/0018473 | A1 | 8/2001 | Otomo et al. | |
| 2002/0010245 | A1 | 1/2002 | Enami et al. | |
| 2005/0250903 | A1 | 11/2005 | Tanaka et al. | |
| 2006/0292840 | A1 | 12/2006 | Lin et al. | |
| 2008/0057325 | A1 | 3/2008 | Sakurai et al. | |
| 2015/0122422 | A1 | 5/2015 | Hayasaka et al. | |
| 2018/0051199 | A1* | 2/2018 | Inafuku | C08L 83/04 |
| 2021/0054199 | A1* | 2/2021 | Tasaki | C08L 83/04 |
| 2021/0277186 | A1 | 9/2021 | Kobayashi et al. | |

FOREIGN PATENT DOCUMENTS

| | | |
|---|---|---|
| JP | 2001-214101 | 8/2001 |
| JP | 2001-348483 | 12/2001 |
| JP | 2002-020391 | 1/2002 |
| JP | 2005-344106 | 12/2005 |
| JP | 2007-154098 | 6/2007 |
| JP | 2008-056761 | 3/2008 |
| JP | 2008-214497 | 9/2008 |
| JP | 2015-090897 | 5/2015 |
| JP | 2016-053107 | 4/2016 |
| WO | 2005/047378 | 5/2005 |
| WO | 2020/071137 | 4/2020 |
| WO | 2020/009007 | 9/2020 |

* cited by examiner

SILICONE GEL COMPOSITION AND SILICONE GEL SHEET

TECHNICAL FIELD

The present invention relates to a silicone gel composition and a silicone gel sheet.

BACKGROUND ART

With the significant improvement in the performance of semiconductor devices such as CPUs in recent years, the amount of heat generated by them has become extremely large. For this reason, heat dissipating materials are attached to electronic components that may generate heat, and a thermally conductive silicone gel sheet is used to improve the adhesion between the heat dissipating materials and the semiconductor devices. In the production of a conventional thermally conductive silicone gel cured product, there is a disproportion between an alkenyl group and a Si—H group in the composition so that some of the reactants will be left unreacted. However, when the composition containing the alkenyl group and the Si—H group in different proportions is cured into a gel, unreacted oil of the material remains in the cured product, which may lead to oil bleeding.

Patent Document 1 proposes a composition that has low elasticity and low stress, and can prevent oil bleeding over time. Specifically, the composition contains 100 parts by mass of an organopolysiloxane (component A) having at least one silicon-bonded alkenyl group in a molecule, and at least 15 parts by weight of an organohydrogenpolysiloxane (component B) having at least two silicon-bonded hydrogen atoms in a molecule. Moreover, the number of the silicon-bonded hydrogen atoms of the composition B is set to 0.3 to 2.5 with respect to 1 silicon-bonded alkenyl group of the component A.

Patent Document 2 proposes a silicone composition that is able to form a cured product that is less hard and is resistant to oil bleeding, even if the composition is highly filled with a thermally conductive filler. Specifically, the silicone composition contains a linear polyorganosiloxane (A1) having two or more silicon-bonded alkenyl groups in a molecule as a base polymer and a branched silicone resin (A2) having no aliphatic unsaturated bond, where the A1/A2 ratio is a predetermined value. The silicone composition also contains a polyorganohydrogensiloxane represented by $R^2Si(OSiR^3{}_2H)_3$ (where $R^2$ is an alkyl group having 1 to 4 carbon atoms or a phenyl group and $R^3$ is an alkyl group having 1 to 4 carbon atoms) in an amount such that the number of SiH groups is 0.3 to 1.5 with respect to 1 silicon-bonded alkenyl group of the component A1.

Patent Document 3 proposes a thermally conductive silicone sheet having a small bleed-out amount of a liquid component such as silicone oil or oligomer. Specifically, the thermally conductive silicone sheet contains a linear organopolysiloxane (A1) having an average of two or more alkenyl groups bonded to silicon at both ends of the molecular chain in a molecule, a branched silicone resin having no aliphatic unsaturated bond, and a crosslinking component represented by $R^2Si(OSiR^3{}_2H)_3$ (where $R^2$ is an alkyl group having 1 to 4 carbon atoms or a phenyl group and $R^3$ is an alkyl group having 1 to 4 carbon atoms).

PRIOR ART DOCUMENTS

Patent Documents

Patent Document 1: JP 2005-344106 A
Patent Document 2: JP 2007-154098 A
Patent Document 3: JP 2015-90897 A

DISCLOSURE OF INVENTION

Problem to be Solved by the Invention

Patent Document 1 discloses a composition with low oil bleeding, in which the number of the silicon-bonded hydrogen atoms of the component B is 1.05 with respect to 1 silicon-bonded alkenyl group of the component A. However, when this composition is formed into a silicone gel sheet, the sheet (cured product) becomes hard.

The present invention provides a silicone gel composition that is able to form a silicone gel cured product that not only can have flexibility, but also can reduce oil bleeding. The present invention also provides a silicone gel sheet.

Means for Solving Problem

A silicone gel composition of the present invention contains the following components A to C:

A 100 parts by mass of an organopolysiloxane that is curable by an addition reaction;

B. 0.01 to 10 parts by mass of an unsaturated hydrocarbon compound having one alkenyl group per molecule; and C. an addition reaction curing catalyst in a catalytic amount.

A silicone gel sheet of the present invention includes the silicone gel composition described above. The silicone gel composition is molded into a sheet and the sheet is cured.

Effects of the Invention

The present invention provides a silicone gel composition that contains an unsaturated hydrocarbon compound having one alkenyl group per molecule, and thus is able to form a silicone gel cured product that not only can have flexibility, but also can reduce oil bleeding. The present invention also provides a silicone gel sheet.

DESCRIPTION OF THE INVENTION

Figure 1A:
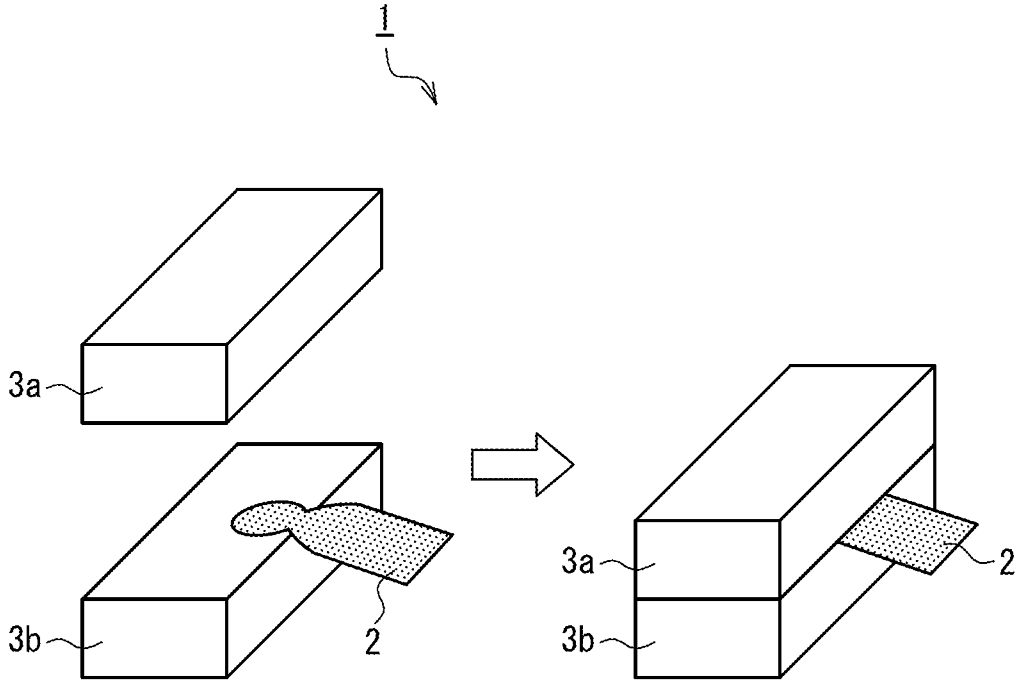
FIGS. 1A to 1B are diagrams illustrating a method for measuring a thermal conductivity of a sample in an example of the present invention.

The disproportion between the alkenyl group and the Si—H group in the organopolysiloxane can help to soften a gel to be formed, but may increase oil bleeding. In such a case, a silicone oil having only one alkenyl group per molecule may be added as a molecular weight modifier to reduce the disproportion between the alkenyl group and the Si—H group in the organopolysiloxane and to impart flexibility to the silicone gel cured product. However, this requires a large amount of the molecular weight modifier that is not easily available, resulting in an increase in cost.

On the other hand, the unsaturated hydrocarbon compound (component B) having one alkenyl group per molecule is inexpensive and relatively easily available. The present invention uses only a small amount of the unsaturated hydrocarbon compound and can provide a silicone gel cured product with flexibility and low oil bleeding.

Hereinafter, the component B, which is one of the distinctive features of the present invention, will be described. The component B is the unsaturated hydrocarbon compound having one alkenyl group per molecule. The unsaturated hydrocarbon compound is preferably an α-olefin that is liquid at room temperature (25° C.) and does not volatilize or decompose at 100° C. When the unsaturated hydrocarbon compound is liquid at room temperature (25° C.), it can be mixed with the component A at room temperature. When the unsaturated hydrocarbon compound does not volatilize or decompose at 100° C., it can be cured with the component A during a curing process and then incorporated into the silicone gel. In other words, a part of the unsaturated bond of the α-olefin undergoes an addition reaction with the Si—H group of the component A, so that the α-olefin can be cured with the component A. Thus, even if the composition is cured while avoiding any unreacted alkenyl group and Si—H group as much as possible, a soft gel cured product with low oil bleeding can be obtained. The unsaturated hydrocarbon compound is preferably at least one of the α-olefin such as 1-decene and α-methylstyrene. The unsaturated hydrocarbon compound is preferably the α-olefin such as 1-decene or α-methylstyrene. In particular, the α-olefin is more preferred. The 1-decene is represented by the fallowing chemical formula 1 and has a melting point of 66.3° C. and a boiling point of 172° C. The α-methylstyrene is represented by the fallowing chemical formula 2 and has a melting point of −23° C. to −24° C.

[Chemical Formula 1]

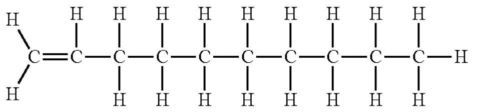

[Chemical Formula 2]

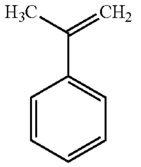

The amount of the component B is 0.01 to 10 parts by mass, preferably 0.1 to 5 parts by mass with respect to 100 parts by mass of the component A. If the amount of the component B is less than 0.01 parts by mass, the effect of the molecular weight adjustment cannot be expected. If the amount of the component B is more than 10 parts by mass, the heat resistance may be reduced. The addition of the component B can reduce the molecular weight of the silicone gel after the curing reaction. The component B has only one reactive site. Therefore, if two components B react with, e.g., a polymer having two reactive groups, the molecular weight of the molecule of the polymer cannot be increased any more. Further, the addition of the component B serves to reduce the hardness of the cured product, since the cured product becomes harder as the molecular weight becomes larger.

Next, the silicone gel composition of the present invention will be described. This composition contains the following components A to C:

A. 100 parts by mass of an organopolysiloxane that is curable by an addition reaction;

B. 0.01 to 10 parts by mass of an unsaturated hydrocarbon compound having one alkenyl group per molecule; and C. an addition reaction curing catalyst in a catalytic amount.

Examples of the component A include the following:

A1. an organopolysiloxane having two or more alkenyl groups per molecule; and

A2. an organohydrogenpolysiloxane having two or more Si—H groups per molecule.

When the components A1 and A2 are commercially available products, they are provided as a solution A and a solution B, respectively. The addition reaction curing catalyst (e.g., a platinum catalyst) of the component C is contained in one or both of the solution A and the solution B.

The ratio of the number of the Si—H groups bonded to silicon atoms in the component A to the total number of the alkenyl groups bonded to silicon atoms in the component A and the alkenyl groups bonded to silicon atoms in the component B is preferably 0.5 or more and 2.0 or less, and more preferably 0.7 or more and 1.5 or less. To reduce unreacted Si—H groups and unreacted alkenyl groups, i.e., to reduce the disproportion between the alkenyl group and the Si—H group in the organopolysiloxane of the composition, the ratio is further preferably 0.9 or more and 1.1 or less.

The component A1 is an organopolysiloxane having two or more alkenyl groups per molecule and is the base resin (base polymer component) of the silicone gel composition of the present invention. In the organopolysiloxane, two or more alkenyl groups having 2 to 8 carbon atoms, particularly 2 to 6 carbon atoms, such as vinyl groups or allyl groups, are bonded to the silicon atoms per molecule. The organopolysiloxane is preferably linear, and the alkenyl groups are preferably positioned at both ends of the molecular chain. The viscosity of the organopolysiloxane is preferably 10 to 100,000 mPa·s, and more preferably 100 to 10,000 mPa·s at 25° C. in terms of workability and curability. The kinematic viscosity of the component A1 is preferably 10 to 10000 $mm^2/s$, more preferably 50 to 1000 $mm^2/s$, and further preferably 60 to 500 $mm^2/s$ for better workability and curability. The kinematic viscosity is measured at 25° C. using an Ubbelohde viscometer, and described in, e.g., the manufacturer's catalog. The number of silicon atoms in a molecule (i.e., the degree of polymerization) may be, e.g., 1 to 1350, and preferably about 150 to 300. Moreover, the organopolysiloxane may include a small amount of branched structure (trifunctional siloxane units) in the molecular chain.

The substituents other than the alkenyl groups in the component A1 are substituted or unsubstituted monovalent hydrocarbon groups that are the same as or different from each other and have no aliphatic unsaturated bond. The monovalent hydrocarbon groups have, e.g., 1 to 10 carbon atoms, and particularly preferably 1 to 6 carbon atoms. Specific examples of the monovalent hydrocarbon groups include the following: alkyl groups such as methyl, ethyl, propyl, isopropyl, butyl, isobutyl, tert-butyl, pentyl, neopentyl, hexyl, cyclohexyl, octyl, nonyl, and decyl groups; aryl groups such as phenyl, tolyl, xylyl, and naphthyl groups; aralkyl groups such as benzyl, phenylethyl, and phenylpropyl groups; and substituted forms of these groups in which some or all hydrogen atoms are substituted by halogen atoms (fluorine, bromine, chlorine, etc.) or cyano groups, including halogen substituted alkyl groups such as chloromethyl, chloropropyl, bromoethyl, and trifluoropropyl groups and cyanoethyl groups.

The alkenyl groups in the component A1 have, e.g., 2 to 6 carbon atoms, and particularly preferably 2 to 3 carbon atoms. Specific examples of the alkenyl groups include vinyl, allyl, propenyl, isopropenyl, butenyl, isobutenyl, hexenyl, and cyclohexenyl groups. In particular, the vinyl group is preferred.

The component A2 is an organohydrogenpolysiloxane having two or more Si—H groups per molecule. The component A2 preferably includes both an organohydrogenpolysiloxane having two Si—H groups per molecule (component A2-1) and an organohydrogenpolysiloxane having three or more Si—H groups per molecule (component A2-2). The amount of the component A2-1 is preferably 50 to 300 parts by mass and the amount of the component A2-2 is preferably 0.1 to 100 parts by mass, and more preferably 0.1 to 30 parts by mass with respect to 100 parts by mass of the component A1 in terms of reducing unreacted Si—H groups and unreacted alkenyl groups.

The molecular structure of the component A2-1 is preferably linear, and the Si—H groups are preferably positioned at both ends of the molecular chain. The number of silicon atoms in a molecule (i.e., the degree of polymerization) may be 2 to 1000, and particularly about 2 to 300. The silicon-bonded organic groups other than the hydrogen atoms may be, e.g., substituted or unsubstituted monovalent hydrocarbon groups that have no aliphatic unsaturated bond. The monovalent hydrocarbon groups have, e.g., 1 to 10 carbon atoms, and particularly preferably 1 to 6 carbon atoms. Specific examples of the monovalent hydrocarbon groups include the following: alkyl groups such as methyl, ethyl, propyl, isopropyl, butyl, isobutyl, tert-butyl, pentyl, neopentyl, hexyl, cyclohexyl, octyl, nonyl, and decyl groups; aryl groups such as phenyl, tolyl, xylyl, and naphthyl groups; aralkyl groups such as benzyl, phenylethyl, and phenylpropyl groups; and substituted forms of these groups in which some or all hydrogen atoms are substituted by halogen atoms (fluorine, bromine, chlorine, etc.) or cyano groups, including halogen-substituted alkyl groups such as chloromethyl, chloropropyl, and bromoethyl groups and cyanoethyl groups. The kinematic viscosity of the component A2-1 is preferably 2 to 10000 $mm^2/s$, more preferably 10 to 2000 $mm^2/s$, and further preferably 50 to 1000 $mm^2/s$ for better workability and curability.

The molecular structure of the component A2-2 is preferably linear. The organohydrogenpolysiloxane may include a small amount of branched structure (trifunctional siloxane units) in the molecular chain. The organohydrogenpolysiloxane of the component A2-2 may have the following structure.

[Chemical Formula 3]

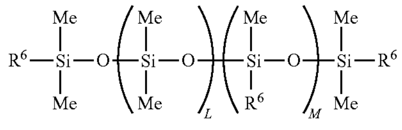

In the formula, $R^6$'s are the same as or different from each other and represent hydrogen, alkyl groups, phenyl groups, epoxy groups, acryloyl groups, methacryloyl groups, or alkoxy groups, and at least three of $R^6$'s are hydrogen. L represents an integer of 0 to 1000, and particularly 0 to 300. M represents an integer of 1 to 200. The kinematic viscosity of the component A2-2 is preferably 20 to 10000 $mm^2/s$, more preferably 10 to 2000 $mm^2/s$, and further preferably 50 to 1000 $mm^2/s$ for better workability and curability.

A curing retarder may be added as needed to the silicone gel composition. The curing retarder may be, e.g., ethynylcyclohexanol. The amount of the curing retarder is preferably 0.001 to 0.1 parts by mass with respect to 100 parts by mass of the component A.

The addition reaction curing catalyst (component C) is a catalyst component that accelerates the curing of the composition. The component C may be a catalyst used for a hydrosilylation reaction. Examples of the catalyst include platinum group metal catalysts such as platinum-based, palladium-based, and rhodium-based catalysts. The platinum-based catalysts include, e.g., platinum black, platinum chloride, chloroplatinic add, a reaction product of chloroplatinic acid and monohydric alcohol, a complex of chloroplatinic acid and olefins or vinylsiloxane, and platinum bis(acetylacetonato). The component C may be mixed in an amount required for curing. The amount of the component C can be appropriately adjusted in accordance with the desired curing rate or the like. The component C is preferably added at a concentration of 0.01 to 1000 ppm based on the weight of metal atoms with respect to the components A1 and A2 in total.

The silicone gel composition of the present invention preferably further contains a thermally conductive filler (also referred to as thermally conductive particles) so that it can have thermal conductive properties. The thermally conductive particles are preferably inorganic particles of e.g., alumina (aluminum oxide), zinc oxide, magnesium oxide, aluminum nitride, boron nitride, aluminum hydroxide, or silica other than hydrophilic fumed silica. These inorganic particles may be added individually or in combinations of two or more. Among them, alumina (aluminum oxide) is preferred because it is inexpensive. The thermally conductive particles have various shapes and can be, e.g., spherical, scaly, polyhedral, or crushed particles. The specific surface area of the thermally conductive particles is preferably 0.06 to 15 $m^2/g$. The specific surface area is a BET specific surface area and is measured in accordance with JIS R 1626. The average particle size of the thermally conductive particles is preferably 0.1 to 100 μm. The average particle size may be measured with a laser diffraction scattering method to determine D50 (median diameter) in a volume-based cumulative particle size distribution. The method may use, e.g., a laser diffraction/scattering parade size distribution analyzer LA-950 S2 manufactured by HORIBA, Ltd.

The thermally conductive filler is preferably added in an amount of 400 to 3000 parts by mass with respect to 100 parts by mass of the component A. The amount of the thermally conductive filler is more preferably 500 to 3000 parts by mass, and further preferably 600 to 3000 parts by mass with respect to 100 parts by mass of the component A. The addition of the thermally conductive filler can increase the thermal conductivity of the cured silicone gel to 1 W/m·K or more.

The thermally conductive particles may include at least two types of inorganic particles with different average particle sizes. This is because small-size inorganic particles fill the spaces between large-size inorganic particles, which can approximate closest packing and improve the thermal conductive properties.

Some or all of the thermally conductive particles of the present invention may be surface treated with a silane coupling agent. The silane coupling agent may be previously mixed with the thermally conductive particles in a pretreatment or may be added when the matrix resin (the components A and B) is mixed with the thermally conductive particles (i.e., an integral blend method). In the integral blend method, the silane coupling agent is preferably added in an amount of 0.01 to 10 parts by weight with respect to 100 parts by weight of the thermally conductive particles that have not been surface treated and are to be used for the silicone gel composition of the present invention. The surface treatment facilitates the filling of the thermally conductive particles into the matrix resin.

The thermally conductive particles may be surface treated with a silane compound, a partial hydrolysate of the silane compound, or an alkoxy group-containing silicone (each also referred to as a silane coupling agent in the following). The silane compound is expressed by $R_aSi(OR')_{4-a}$ (where R represents a substituted or unsubstituted organic group having 1 to 20 carbon atoms, R' represents an alkyl group having 1 to 4 carbon atoms, and a is 0 or 1). Examples of the slime coupling agent include silane compounds such as octyltrimethoxysilane, octyltriethoxysilane, decyltrimethoxysilane, decyltriethoxysilane, dodecyltrimethoxysilane, and dodecyltriethoxysilane. These silane coupling agents may be used individually or in combinations of two or more. In this case, alkoxysilane may be used together with one-end silanol siloxane or one-end trimethoxysilyl polysiloxane as a surface treatment agent. The surface treatment may include adsorption in addition to a covalent bond. The surface treatment of the thermally conductive particles prevents the adsorption of the curing catalyst on the thermally conductive particles, thereby preventing curing inhibition. This is useful for improving the storage stability.

The thermal conductivity of the thermally conductive silicone gel sheet of the present invention is preferably 1 to 5 W/m-K, more preferably 1.2 to 4.5 W/m·K, and further preferably 1.5 to 4 W/m·K. The thermal conductivity is measured by a hot disk (in accordance with ISO/CD 22007-2), as will be described later.

The Asker C hardness of the thermally conductive silicone gel sheet of the present invention is preferably 3 to 70, more preferably 5 to 60, and further preferably 5 to 30. The Asker C hardness is measured in accordance with JIS K 7312.

The oil bleeding rate of the thermally conductive silicone gel sheet of the present invention is preferably 0.5% or less, and more preferably 0.4% or less. The oil bleeding rate is measured in such a manner that the thermally conductive silicone gel sheet is sandwiched between two pieces of polytetrafluoroethylene filter paper, compressed to a thickness that is 60% of its original thickness, and allowed to stand for 24 hours in an atmosphere of 80° C. Then, the oil bleeding rate is calculated based on a change in the weight of the filter paper. The oil bleeding rate can be determined by a method as described in Examples.

A method for producing a thermally conductive silicone gel sheet of the present invention includes uniformly mixing the composition described above, molding the composition into a sheet, and thermally curing the sheet. In the sheet molding process, the composition is preferably sandwiched between polyethylene terephthalate (PET) films and then rolled. The thickness of the sheet is preferably 0.1 to 5.0 mm. The thermal curing process is preferably performed by a heat treatment at 70° C. to 150° C. for 10 to 120 minutes.

The composition of the present invention may include components other than the above as needed. For example, a heat resistance improver (such as colcothar, titanium oxide, or cerium oxide) and a flame retardant auxiliary may be added. Moreover, an organic or inorganic particle pigment may be added for the purpose of coloring and toning.

EXAMPLES

Hereinafter, the present invention will be described by way of examples. However, the present invention is not limited to the following examples. Various parameters were measured in the following manner.

<Hardness>

The Asker C hardness was measured in accordance with JIS K 7312.

<Oil Bleeding Rate>

The oil bleeding rate was measured in such a manner that a silicone gel sheet with a width of 25 mm, a length of 25 mm, and a thickness of 3.0 mm was sandwiched between two pieces of PTFE filter paper, compressed to a thickness of 1.8 mm, and allowed to stand for 24 hours in an atmosphere of 80° C. The oil adsorbed on the PTFE filter paper was bleed oil and calculated by the following formula.

Oil bleeding rate=(weight of filter paper after test−weight of filter paper before test)/weight of silicone gel sheet before test×100

<Thermal Conductivity>

Figure 1B:
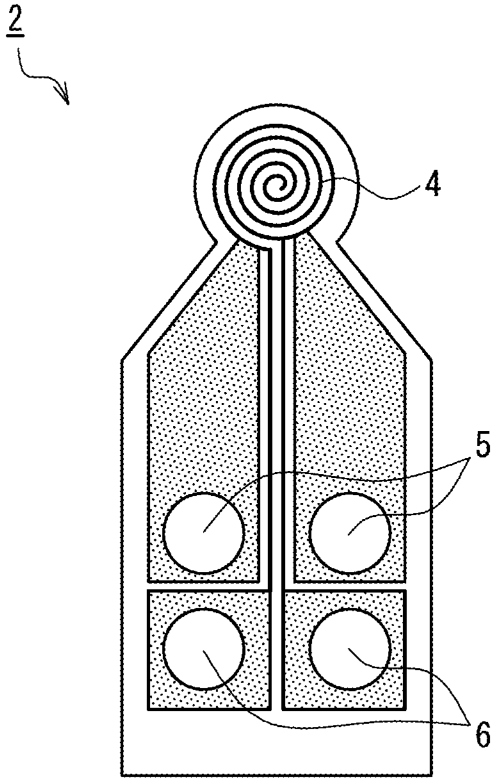

The thermal conductivity was measured by a hot disk (in accordance with ISO/CD 22007-2). As shown in FIG. 1A using a thermal conductivity measuring apparatus 1, a polyimide film sensor 2 was sandwiched between two samples 3*a*, 3*b*, and constant power was applied to the sensor 2 to generate a certain amount of heat. Then, the thermal characteristics were analyzed from the value of a temperature rise of the sensor 2. The sensor 2 has a tip 4 with a diameter of 7 mm. As shown in FIG. 1B, the tip 4 has a double spiral structure of electrodes. Moreover, an electrode 5 for an applied current and an electrode 6 for a resistance value (temperature measurement electrode) are located on the lower portion of the sensor 2. The thermal conductivity was calculated by the following formula (1).

$$\lambda = \frac{Po \cdot D(\tau)}{\pi^{3/2} \cdot r} \cdot \frac{D(\tau)}{\Delta T(\tau)} \quad \text{[Formula 1]}$$

λ: Thermal conductivity (W/m·K)

$P_0$: Constant power (W)

r: Radius of sensor (m)

τ: $\sqrt{\alpha \cdot t/r^2}$

α: Thermal diffusivity of sample ($m^2/s$)

t: Measuring time (s)

D(τ): Dimensionless function of τ

ΔT(τ): Temperature rise of sensor (K)

Example 1

(1) Component A

Commercially available two-part addition reaction curable silicone gel (manufactured by Dow Toray Co., Ltd., product number: CY52-276) which is composed of a solution A and a solution B, the solution A containing a curing catalyst (component C), and which meets the requirements for the components A1, A2, and C of the present invention: 50 g of the solution A and 50 g of the solution B, making a total of 100 g (2) Component B 1-decene (unsaturated hydrocarbon): 0.5 g (3) Thermally Conductive Particles (i) Irregularly-shaped alumina which has an average particle size of 0.3 μm and is surface treated with octyltrimethoxysilane (D1): 51 g (ii) Crushed alumina which has an average particle size of 2.1 μm and is surface treated with decyltrimethoxysilane (D2): 657 g (iii) Spherical alumina which has an average particle size of 20 μm and is not surface treated (D4): 556 g The above components were mixed together. The resulting composition was sandwiched between polyethylene terephthalate (PET) films and rolled to a thickness of 3.0 mm, so that the composition was molded into a sheet. The sheet was then cured at 100° C. for 10 minutes.

The cured sheet thus obtained was evaluated.

Example 2

Example 2 was performed in the same manner as Example 1 except that 1 g of α-methylstyrene was used as an unsaturated hydrocarbon instead of 1-decene.

Example 3

(1) Component A (i) Linear dimethylpolysiloxane having a vinyl group at each end of the molecular chain, which has a kinematic viscosity of 350 $mm^2/s$: 31.56 g (ii) Linear organohydrogenpolysiloxane having two Si—H groups per molecule, which has a kinematic viscosity of 1000 $mm^2/s$: 67.86 g (iii) Linear organohydrogenpolysiloxane having three or more Si—H groups per molecule, which has a kinematic viscosity of 30 $mm^2/s$: 0.58 g (2) Component B 1-decene (unsaturated hydrocarbon): 1 g (3) Thermally Conductive Particles (i) Spherical alumina which has an average particle size of 2 μm and is not surface treated (D3): 150 g (ii) Spherical alumina which has an average particle size of 75 μm and is not surface treated (D5): 400 g (4) Platinum Catalyst: 0.3 g (5) Curing Retarder, Ethynylcyclohexanol: 0.02 g The mixing, molding, and curing processes were performed in the same manner as Example 1.

In the composition of Example 3, the ratio of the number of the Si—H groups bonded to the silicon atoms in the component A to the total number of the alkenyl groups bonded to the silicon atoms in the component A and the alkenyl groups bonded to the silicon atoms in the component B (the number of Si—H groups/the number of alkenyl groups) was 1.1.

Example 4

Example 4 was performed in the same manner as Example 3 except that the amount of each component of the component A was changed, and 1 g of α-methylstyrene was used as an unsaturated hydrocarbon instead of 1-decene.

In the composition of Example 4, the ratio of the number of the Si—H groups bonded to the silicon atoms in the component A to the total number of the alkenyl groups bonded to the silicon atoms in the component A and the alkenyl groups bonded to the silicon atoms in the component B (the number of Si—H groups/the number of alkenyl groups) was 1.1.

Comparative Examples 1 to 5

Comparative Example 5 was performed under the conditions shown in Table 2.

In the composition of Comparative Example 5, the ratio of the number of the Si—H groups bonded to the silicon atoms in the component A to the total number of the alkenyl groups bonded to the silicon atoms in the component A and the alkenyl groups bonded to the silicon atoms in the component B (the number of Si—H groups/the number of alkenyl groups) was 1.1.

Tables 1 and 2 show the results.

TABLE 1

| | Ex. 1 | Ex. 2 | Comp. Ex. 1 | Comp. Ex. 2 | Comp. Ex. 3 | Comp. Ex. 4 |
|---|---|---|---|---|---|---|
| Component A: two-part curable silicone gel solution A (g) | 50 | 50 | 50 | 50 | 50 | 50 |
| Component A: two-part curable silicone gel solution B (g) | 50 | 50 | 50 | 50 | 50 | 50 |
| Component A1: having vinyl at both ends and a kinematic viscosity of 350 $mm^2/s$ (g) | — | — | — | — | — | — |
| Component A2: polysiloxane having two Si—H groups (g) | — | — | — | — | — | — |
| Component A2: polysiloxane having three or more Si—H groups (g) | — | — | — | — | — | — |
| Component B: 1-decene (g) | 0.5 | — | — | — | — | — |
| Component B: α-methylstyrene (g) | — | 1 | — | — | — | — |
| Component C: platinum catalyst (g) | * | * | * | * | * | * |
| Curing retarder (g) | — | — | — | — | — | — |
| One-end vinyl organopolysiloxane (g) | — | — | — | 1 | 2 | — |
| Dimethylsiloxane 300CS (g) | — | — | — | — | — | 2 |
| Component D1: irregularly-shaped, surface treated alumina, D50 = 0.3 μm (g) | 51 | 51 | 50 | 51 | 51 | 51 |
| Component D2: crushed, surface treated alumina, D50 = 2.1 μm (g) | 657 | 657 | 650 | 657 | 663 | 663 |
| Component D3: spherical alumina, D50 = 2 μm (g) | — | — | — | — | — | — |
| Component DT spherical alumina, D50 = 20 μm (g) | 556 | 556 | 550 | 556 | 561 | 561 |

TABLE 1-continued

| | Ex. 1 | Ex. 2 | Comp. Ex. 1 | Comp. Ex. 2 | Comp. Ex. 3 | Comp. Ex. 4 |
|---|---|---|---|---|---|---|
| Component D5: spherical alumina, D50 = 75 μm (g) | — | — | — | — | — | — |
| Hardness (Asker C) | 24 | 21 | 29 | 26 | 24 | 29 |
| Oil bleeding rate (%) | 0.17 | 0.17 | 0.16 | 0.14 | 0.19 | 0.19 |
| Thermal conductivity (W/m · K) | 3.0 | 3.0 | 3.0 | 3.0 | 3.0 | 3.0 |

* The platinum catalyst is contained in the solution A

TABLE 2

| | Ex. 3 | Ex. 4 | Comp. Ex. 5 |
|---|---|---|---|
| Component A: two-part curable silicone gel solution A (g) | — | — | — |
| Component A: two-part curable silicone gel solution B (g) | — | — | — |
| Component A1: having vinyl at both ends and a kinematic viscosity of 350 $mm^2/s$ (g) | 31.56 | 30.13 | 68.1 |
| Component A2: polysiloxane having two Si—H groups (g) | 67.86 | 69.31 | 6.5 |
| Component A2: polysiloxane having three or more Si—H groups (g) | 0.58 | 0.56 | 0.8 |
| Component B: 1-decene (g) | 1 | — | — |
| Component B: α-methylstyrene (g) | — | 1 | — |
| Component C: platinum catalyst (g) | 0.30 | 0.30 | 0.3 |
| Curing retarder (g) | 0.02 | 0.02 | 0.02 |
| One-end vinyl organopolysiloxane (g) | — | — | 24.6 |
| Dimethylsiloxane 300 CS (g) | — | — | — |
| Component D1: irregularly-shaped, surface treated alumina, D50 = 0.3 μm (g) | — | — | — |
| Component D2: crushed, surface treated alumina, D50 = 2.1 μm (g) | — | — | — |
| Component D3: spherical alumina, D50 = 2 μm (g) | 150 | 150 | 150 |
| Component D4: spherical alumina, D50 = 20 μm (g) | — | — | — |
| Component D5: spherical alumina, D50 = 75 μm (g) | 400 | 400 | 400 |
| Number of Si—H groups/Number of alkenyl groups | 1.1 | 1.1 | 1.1 |
| Hardness (Asker C) | 18 | 15 | 15 |
| Oil bleeding rate (%) | 0.35 | 0.21 | 0.45 |
| Thermal conductivity (W/m · K) | 1.4 | 1.4 | 1.4 |

The results revealed the following.

(1) Examples 1, 2 and Comparative Example 1 confirm that the unsaturated hydrocarbon is effective in reducing the hardness.

(2) In Examples 1, 2 and Comparative Examples 2, 3, 4, the amount of the unsaturated hydrocarbon required to reduce the hardness is smaller than that of the one-end vinyl polysiloxane or dimethylpolysiloxane. In particular, as is evident from Example 1 and Comparative Example 3, 1-decene added in an amount equal to one-fourth of the amount of the one-end vinyl polysiloxane or dimethylpolysiloxane can exhibit an effect comparable to that obtained by the one-end vinyl polysiloxane.

(3) The silicone gel sheets of Examples 3, 4 and Comparative Example 5 are obtained by curing the respective compositions so that unreacted Si—H groups and unreacted vinyl groups can be reduced as much as possible. The comparison of Examples 3, 4 and Comparative Example 5 shows that the addition of a very small amount of the unsaturated hydrocarbon is sufficient to form the gel, compared to the use of the one-end vinyl polysiloxane. In particular, the silicone gel sheet of Example 4 (containing 1 g of the unsaturated hydrocarbon) has the same hardness as the silicone gel sheet of Comparative Example 5 (containing 24.6 g of the one-end vinyl polysiloxane), but uses a smaller amount of the unsaturated hydrocarbon added.

As described above, the silicone gel sheets of Examples 1 to 4 can have flexibility by the addition of only a small amount of the component B.

INDUSTRIAL APPLICABILITY

The thermally conductive silicone gel composition of the present invention and the silicone gel sheet formed by using the composition are suitable to be interposed between a heat generating member and a heat dissipating material of electrical and electronic components or the like.

DESCRIPTION OF REFERENCE NUMERALS

1 Thermal conductivity measuring apparatus

2 Sensor

**3*a*, 3*b*** Sample

4 Tip of the sensor

5 Electrode for applied current

6 Electrode for resistance value (temperature measurement electrode)

The invention claimed is:

1. A silicone gel composition comprising the following components:

A. 100 parts by mass of an organopolysiloxane that is curable by an addition reaction;

B. 0.01 to 10 parts by mass of an unsaturated hydrocarbon compound having one alkenyl group per molecule;

C. an addition reaction curing catalyst in a catalytic amount; and a thermally conductive filler, wherein a thermal curing temperature is 70° C. to 150° C., the component A includes components A1 and A2, with the component A2 including both components A2-1 and A2-2 as follows:

A1. an organopolysiloxane having two or more alkenyl groups per molecule;

A2. an organohydrogenpolysiloxane having two or more Si—H groups per molecule;

A2-1. an organohydrogenpolysiloxane having two Si—H groups per molecule; and

A2-2. an organohydrogenpolysiloxane having three or more Si—H groups per molecule; and the silicone gel composition comprises:

50 to 300 parts by mass of the component A2-1; and 0.1 to 100 parts by mass of the component A2-2 with respect to 100 parts by mass of the component A1.

2. The silicone gel composition according to claim 1, wherein the unsaturated hydrocarbon compound is at least one selected from the group consisting of an α-olefin that is liquid at 25° C. and does not volatilize or decompose at 100° C. and α-methylstyrene.

3. The silicone gel composition according to claim 1, wherein the unsaturated hydrocarbon compound is 1-decene.

4. The silicone gel composition according to claim 1, wherein a ratio of a number of Si—H groups bonded to silicon atoms in the component A to a total number of alkenyl groups bonded to silicon atoms in the component A and alkenyl groups bonded to silicon atoms in the component B is 0.5 or more and 2.0 or less.

5. The silicone gel composition according to claim 1, wherein the component A1 is a linear dimethylpolysiloxane having vinyl groups at both ends of a molecular chain.

6. The silicone gel composition according to claim 1, wherein a content of the thermally conductive filler is 400 to 3000 parts by mass with respect to 100 parts by mass of the component A.

7. The silicone gel composition according to claim 1, wherein the thermally conductive filler includes at least two types of thermally conductive fillers with different average particles sizes.

8. The silicone gel composition according to claim 7, wherein at least one of the at least two types of the thermally conductive fillers is surface treated with $R_aSi(OR')_{4-a}$, where R represents a substituted or unsubstituted organic group having 8 to 12 carbon atoms, R' represents an alkyl group having 1 to 4 carbon atoms, and a is 0 or 1.

9. A silicone gel sheet comprising:

the silicone gel composition according to claim 1, wherein the silicone gel composition is molded into a sheet and the sheet is cured.

10. The silicone gel sheet according to claim 9, wherein an oil bleeding rate of the silicone gel sheet is 0.5% or less, which is measured after the silicone gel sheet is compressed to a thickness that is 60% of its original thickness, and allowed to stand for 24 hours in an atmosphere of 80° C.

* * * * *